United States Patent [19]

Hinton et al.

[11] 4,308,653

[45] Jan. 5, 1982

[54] APPARATUS FOR INSERTING PILE WEATHERSTRIP IN A GROOVE

[75] Inventors: Kevin Hinton, Hitchin; Barry R. Guymer, Biggleswade, both of England

[73] Assignee: Schlegel (UK) Limited, Seacroft, England

[21] Appl. No.: 82,920

[22] Filed: Oct. 9, 1979

[30] Foreign Application Priority Data

Oct. 13, 1978 [GB] United Kingdom ............. 40406/78

[51] Int. Cl.³ .................. B23P 19/02; B23P 19/04
[52] U.S. Cl. ...................... 29/235; 29/241; 29/433; 29/451
[58] Field of Search .............. 29/241, 235, 234, 451, 29/433

[56] References Cited

U.S. PATENT DOCUMENTS

| | | | |
|---|---|---|---|
| 1,556,234 | 10/1925 | Maise | 29/235 |
| 1,839,429 | 1/1932 | Weaver | 29/235 |
| 2,311,326 | 2/1943 | Birkin | 29/241 X |
| 2,550,898 | 5/1951 | Youngblood et al. | 29/241 |
| 2,638,131 | 5/1953 | Rohs | 29/235 X |
| 2,924,007 | 2/1960 | Wrightfield | 29/235 X |
| 3,027,629 | 4/1962 | Wrightfield | 29/235 |
| 3,335,487 | 8/1967 | Ellenberg et al. | 29/235 |
| 3,731,365 | 5/1973 | Fryatt | 29/241 |

*Primary Examiner*—Charlie T. Moon
*Attorney, Agent, or Firm*—Cumpston & Shaw

[57] ABSTRACT

An apparatus for feeding a flexible elongate member, e.g. pile weatherstrip, into a groove in an elongated member, the apparatus being capable of being driven by an electric motor or drill and including a pair of rollers defining a nip through which the pile is driven into an outlet guide with which the groove in the elongated member is aligned at the downstream end thereof. It is preferred that two sets of roller nips are provided, there being a common roller for each nip and there being an inlet guide to direct the pile weatherstrip into a first nip, and an intermediate guide to direct the weatherstrip from the first nip to the second nip and hence into the outlet guide. Preferably, the roller common to each pair is driven via a toothed belt, and the other two rollers can be moved towards or away from said common roller. Preferably, this roller has a grooved periphery to receive the pile of the weatherstrip and all the rollers are knurled.

12 Claims, 3 Drawing Figures

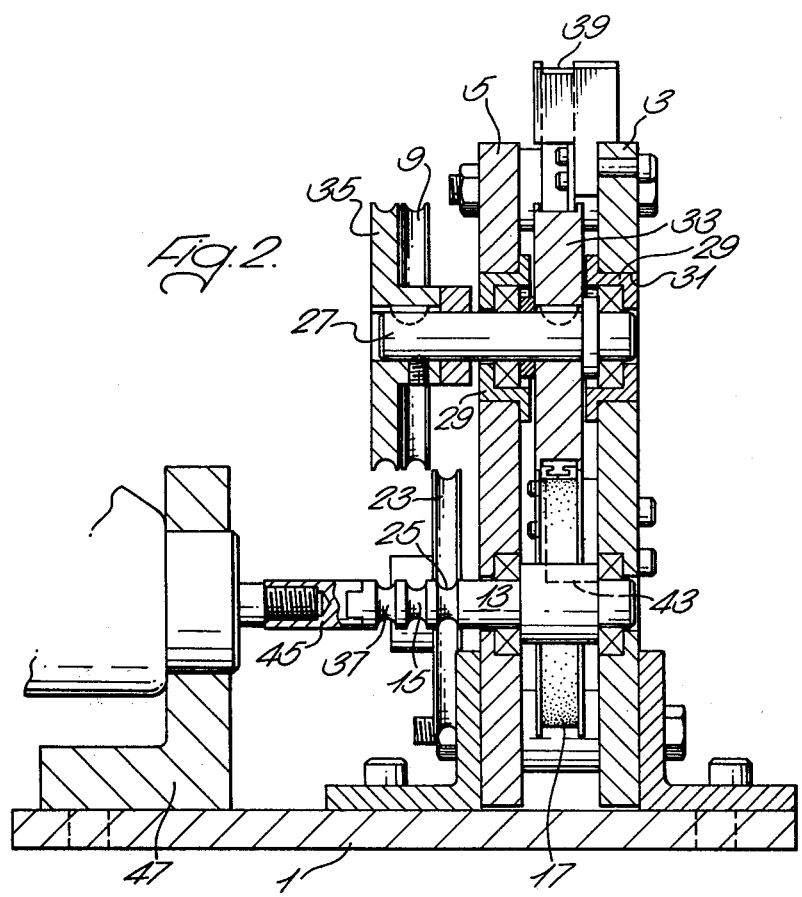

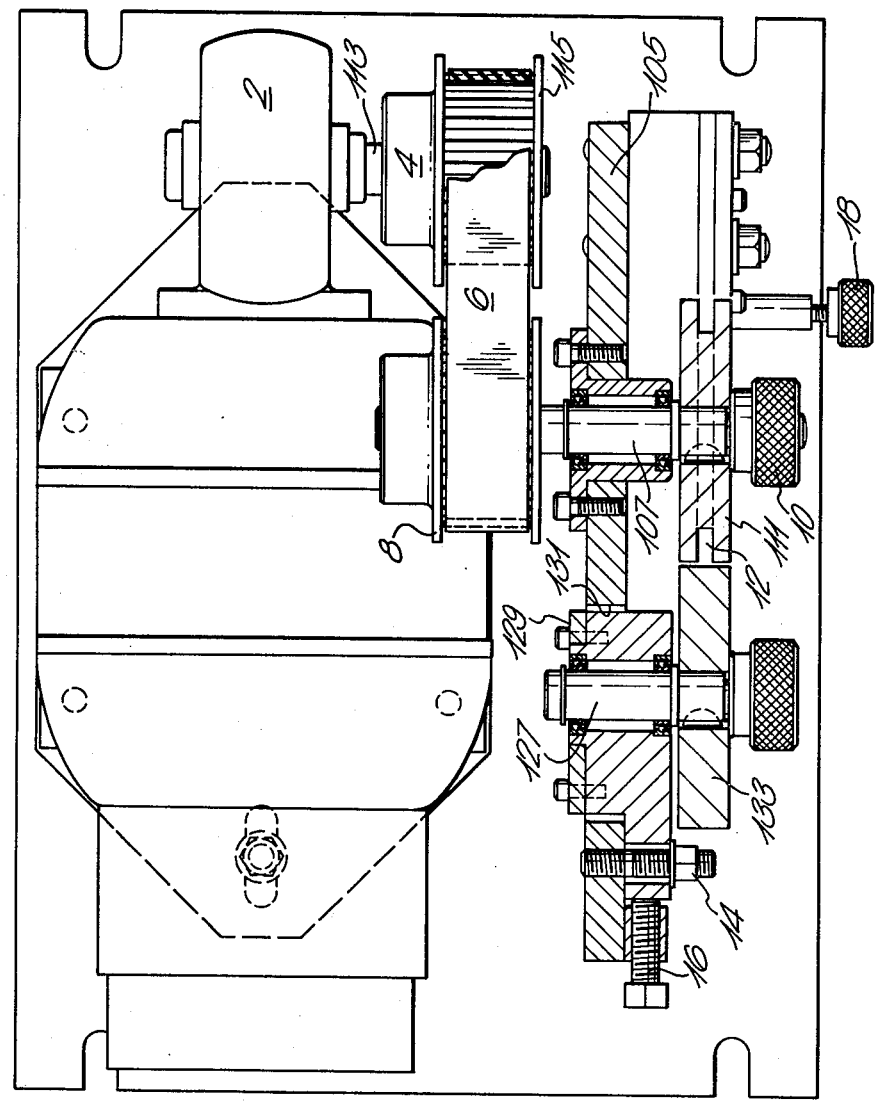

APPARATUS FOR INSERTING PILE WEATHERSTRIP IN A GROOVE

This invention relates to apparatus for inserting weatherstrip into elongated normally rigid members provided with a weatherstrip-receiving groove.

Traditionally, weatherstrip, especially pile weatherstrip, has been inserted into grooves in elongated members either by hand or by means of a machine which pulls the weatherstrip along the groove. There are obvious disadvantages in inserting the weatherstrip by hand and one of the problems with the known methods of machine insertion is that the machines have to be as long as the elongate member, e.g. aluminium section, into which the weatherstrip is being inserted. Furthermore, if the weatherstrip-receiving groove in the member is on an inside face of the member, it is likely that the pulling head of the machine cannot be inserted into the groove and hence it has only been possible in the past to insert the weatherstrip by hand.

We have now devised an and apparatus which overcomes the above disadvantages.

According to the broadest aspect of the present invention, we provide apparatus for feeding an elongate flexible member, e.g. pile weatherstrip, into a groove in an elongated member, the apparatus including a pair of contra-rotating pile weatherstrip advancing rollers between the nip of which the pile weatherstrip is arranged to be advanced, an outlet guide downstream of the nip of the rollers to receive the pile weatherstrip as it emerges therefrom, drive means for rotating the rollers and means on the outlet guide downstream from said nip with which the groove in the elongated member can be aligned to receive the advancing pile weatherstrip.

Preferably, a third pile weatherstrip advancing roller is provided which forms a further nip with one of the rollers of the pair, the pile weatherstrip being guided through this further nip so as to increase the forces acting on the pile weatherstrip to advance it into the groove.

Preferably, a guide block is provided to guide the pile weatherstrip into the further nip. Preferably, a line drawn through the rotational axes of the pair of rollers extends substantially at right angles to a line drawn through the rotational axes of the third roller and the roller of the pair with which it forms the further nip.

Preferably, a guide is provided to guide the pile weatherstrip from the further nip to the first-mentioned nip.

In a preferred arrangement, said one roller is driven, via a toothed drive belt, by an electric motor. Preferably, a groove is provided in the surface of this roller to accommodate the pile of the weatherstrip, the surface of the roller, and that of the other roller(s) otherwise being knurled.

In an alternative arrangement, each of the three rollers is mounted on a roller spindle, these spindles being driven from a common drive shaft by means of suitable drive belts. In this construction, one of the rollers of the first pair has a non-compressible tyre on its surface and the other roller of the pair has a tyre made of brush-like material on its surface, and the third advancing roller has a rubber tyre on its surface.

Two embodiments of the present invention are now described by way of example with reference to the accompanying drawings, in which:

FIG. 2 is a section on the line A—A of FIG. 1, and

FIG. 3 is a sectional plan view of a second, preferred embodiment of apparatus, but showing the apparatus the opposite way round with respect to FIG. 2.

Figure 1:
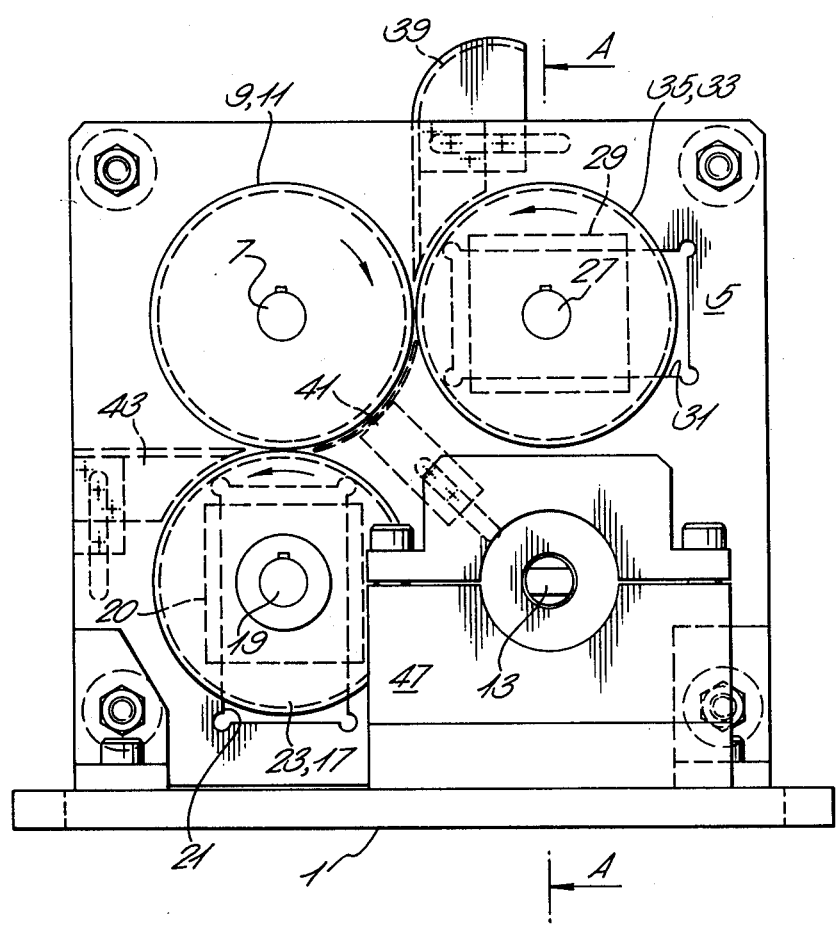
FIG. 1 is a side elevation of one embodiment of pile weatherstrip inserting apparatus.

Referring to FIGS. 1 and 2 of the drawings, the apparatus includes a base 1 and a pair of upstanding support plates 3 and 5. A spindle 7 is mounted for rotation about a fixed axis normal to the plates 3 and 5, there being a drive pulley 9 and a pile advancing roller 11 keyed to the spindle 7. The drive pulley 9 is driven from a drive shaft 13 by means of a twisted drive belt (not shown) engaging in a groove 15 in the drive shaft 13. A second pile advancing roller 17 is rotatably mounted between the plates 3 and 5 on a spindle 19, the spindle 19 being supported in suitable journals (not shown) mounted in slides 20 supported in a slideway 21 formed in each of the plates 3 and 5 so that the spindle 19 can be moved towards and away from the spindle 7 to accommodate different thicknesses of pile passing through the nip between the rollers 11 and 17. The spindle 19 is rotated by means of a drive belt (not shown) passing round a drive pulley 23 which is keyed to the spindle 19 and engaging with a groove 25 in the drive shaft 13.

A further spindle 27 is adjustably supported between the plates 3 and 5 in slides 29 slidably supported in slideways 31 formed in the plates 3 and 5 so that the spindle 27 can be moved towards and away from the spindle 7, the arrangement being such that the direction of movement of the spindle 27 is along a line extending at substantially right angles to the direction of movement of the spindle 19.

A roller 33 is keyed to the spindle 27 which is driven by means of a twisted endless belt (not shown) engaging around a drive pulley 35 keyed to the spindle 27 and a groove 37 formed in the drive shaft 13.

As can be seen from FIG. 1, each of the rollers 11, 17 and 33 is of the same diameter and their spindles 7, 19 and 27 are so located that a first nip is provided between the rollers 11 and 17 and a further nip is provided between the rollers 11 and 33 through which nips pile weatherstrip to be inserted into a groove in an elongated member is entrained. The pile weatherstrip is fed first into the further nip via an inlet guide 39 and after passing out of the further nip it is guided around the surface of the roller 11 by a guide 41 and thence into the first nip and as it emerges from this first nip it passes into an outlet guide 43. Means may be provided on the outlet guide 43 to locate the elongated member having a groove into which the pile weatherstrip is to be inserted, the arrangement being such that the groove is aligned with the pile as it emerges from the downstream end of the guide 43. It will be appreciated that because the drive belts for the rollers 33 and 17 are twisted, these rollers will be driven anti-clockwise as the drive shaft 13 rotates clockwise, whereas the roller 11 will rotate in a clockwise direction. We have found that high driving forces can be imparted to the pile weatherstrip if the roller 33 is provided with a rubber tyre on its surface and the roller 11 is provided with a tyre made of brush-like material, e.g. material known as VELCROSE, the fibres of which mesh with the fibres of the pile weatherstrip. The roller 17, however, which must provide a datum surface for the emerging weatherstrip, must have a hard non-compressible tyre on its surface, for example a coarse emery cloth strip.

The drive shaft 13 can be driven in any known manner but is particularly designed to be driven by an electric motor. Alternatively, it may be driven by any commercially available electric hand drill from which the chuck is removed and replaced by a drive peg 45. The drill can be supported in a suitable stand 47 mounted on the base 1 of the apparatus.

By adjusting the position of the spindles 19 and 27, the required compression and hence grip on the pile weatherstrip can be achieved and different thicknesses of pile weatherstrip can be accommodated. Likewise, the three guides 39, 41 and 43 can be changed to accommodate different types of pile weatherstrip (or adjusted).

Although the above-described apparatus is only designed to feed one length of pile weatherstrip at a time into a groove of the elongated member, and hence the rollers 11, 17 and 33 are relatively thin and are arranged in the same vertical plane, it could easily be modified by the duplication of the rollers or increase in the width of the rollers to feed a plurality of pile weatherstrips into a plurality of grooves.

Normally, for safety reasons, the whole apparatus would be housed within an overall casing and it is envisaged that an automatic cutting head could be mounted on the apparatus to cut the pile after it has been inserted into its groove. Furthermore, it is envisaged that a microswitch cut-out could be provided which would operate when the pile reaches the end of its groove.

The above-described apparatus is small and mobile and because it can be driven by an electric drill it can be set up wherever there is an electrical supply. Furthermore, it can feed pile weatherstrip into grooves in the elongated members regardless of the location of the groove and of course it can be used by unskilled operators.

Referring now to FIG. 3, parts shown therein which are similar to the parts shown in the embodiment of FIGS. 1 and 2 have reference numerals 100 higher than those of FIGS. 1 and 2.

In FIG. 3, an electric motor 2 is provided to advance pile weatherstrip through the apparatus. The motor 2 has an output shaft 113 which drives a speed reducer 4 which has an output pulley 115. Entrained around the output pulley 115 and engaging teeth thereon is a toothed drive belt 106 which is also entrained around a drive pulley 8 on the input spindle 107 of the pile advancing roller 111. The roller 111 is keyed to the spindle 107 but can easily be removed and replaced by a different roller by removal of a knurled thumb nut 10 screwthreadedly engaged on a free end of the spindle 107. The roller 111 has a knurled periphery and is cut away at its centre to provide an annular groove 12. The dimensions of this groove are sufficient to receive the pile and any barrier film of a length of pile weatherstrip passing through the machine.

The rollers 133 and 123 (not visible in FIG. 3) can be moved towards and away from the roller 109 as in the construction shown particularly in FIG. 1 and each of these rollers also has a knurled periphery. Thus, side edge portions of the backing strip of the weatherstrip can be sandwiched between the periphery of two adjacent rollers and tightly held in the nip by suitable adjustment of the two rollers 133 and 123. This means that there is no need to drive either of the rollers 133 and 123 but on the other hand a more positive drive by means of the toothed drive belt 6 to the roller 111 is required than occurs in the FIGS. 1, 2 embodiment.

To adjust the roller 133 relative to the roller 111, a locking nut 14 is first loosened, whereupon an adjustment stud 16 is rotated to cause the slide 129 to be moved towards or away from the spindle 107. When the correct spacing has been achieved, then the locking nut 14 is tightened so as firmly to fix the slide 129 relative to the support plate 105 and hence fix the position of the roller 133 and its spindle 127 relative to the spindle 107.

It is important that pile material fed into the apparatus is guided firstly into the nip between the rollers 111 and 133 by a guide-in channel and immediately it passes from this nip it is guided around the surface of the roller 111 into the nip between the roller 111 and the roller 123. Immediately on emerging from this nip the pile material will pass into a groove in a guideout channel which itself may have a transverse slot therein for cutting off lengths of weatherstrip.

It is preferred that a guard be provided for the mechanism and this may be in the form of a dome which overlies the mechanism and is secured to the plate 5 by one or more thumb screws 18.

If desired, the apparatus, instead of being driven by an electric motor through a reduction gear or by means of an electric drill, may be driven by hand by means of a handle and a suitable drive train.

Although the invention has been particularly designed for inserting flexible pile weatherstrip into a rigid grooved elongate member, it will be appreciated that the invention could be used to insert any flexible elongate member into any grooved member.

We claim:

1. Apparatus for feeding an elongate flexible member, e.g. pile weatherstrip, into a groove in an elongated member, the apparatus comprising a frame, a pair of contra-rotating pile weatherstrip advancing rollers mounted on said frame and forming a first nip, a third pile weatherstrip advancing roller, means mounting said third roller on said frame so that it forms a further nip with one of the rollers of said pair, means to drive all of said rollers, means to guide the pile weatherstrip through said further nip of said rollers so as to increase the forces acting on the pile weatherstrip to advance it into the groove, means to guide the pile weatherstrip into and through said first nip of said pair of rollers, and an outlet guide downstream of the further nip of the third roller and one of said pair of rollers to receive the pile weatherstrip as it emerges therefrom, the arrangement being such that the groove in the elongated member can be aligned with said outlet guide to receive the advancing pile weatherstrip.

2. Apparatus according to claim 1 wherein a guide block is provided to guide the pile weatherstrip into said further nip.

3. Apparatus according to claim 1 wherein a line drawn through the rotational axes of said pair of rollers extends substantially at right angles to a line drawn through the rotational axes of said third roller and the roller of the pair with which it forms said further nip.

4. Apparatus according to claim 1 wherein a guide is provided to guide the pile weatherstrip from said further nip to said first mentioned nip.

5. Apparatus according to claim 1 including a spindle for each roller, means mounting said rollers on their respective spindle, a common drive shaft and suitable drive belts entrained around said common drive shaft and the respective spindles to drive the latter.

6. Apparatus according to claim 5 including means for adjusting at least one of the rollers relative to the other two rollers.

7. Apparatus according to claim 1 wherein one of said rollers of said pair of advancing rollers has a hard non-compressible tyre on its surface and the other has a tyre made of brush-like material.

8. Apparatus according to claim 1 wherein said third roller has a rubber tyre on its surface.

9. Apparatus according to claim 1 wherein each roller is mounted on a spindle, drive means driving one of said pair of rollers and means for adjusting the other roller of said pair and said third roller relative to said one roller.

10. Apparatus according to claim 9 wherein said drive means comprises an electric motor, a reduction gear driven by said motor and a toothed drive belt entrained around an output sprocket from said reduction gear and an input sprocket for said one roller.

11. Apparatus according to claim 1 wherein said one roller has a centrally grooved periphery.

12. Apparatus according to claim 1 wherein all said rollers have a knurled periphery.

* * * * *